3,292,918
VARIABLE-RATE STABILIZING ASSEMBLY FOR MOTOR VEHICLES
Charles W. Hart, P.O. Box 735, Grass Valley, Calif. 95945
Filed Mar. 22, 1965, Ser. No. 441,790
10 Claims. (Cl. 267—11)

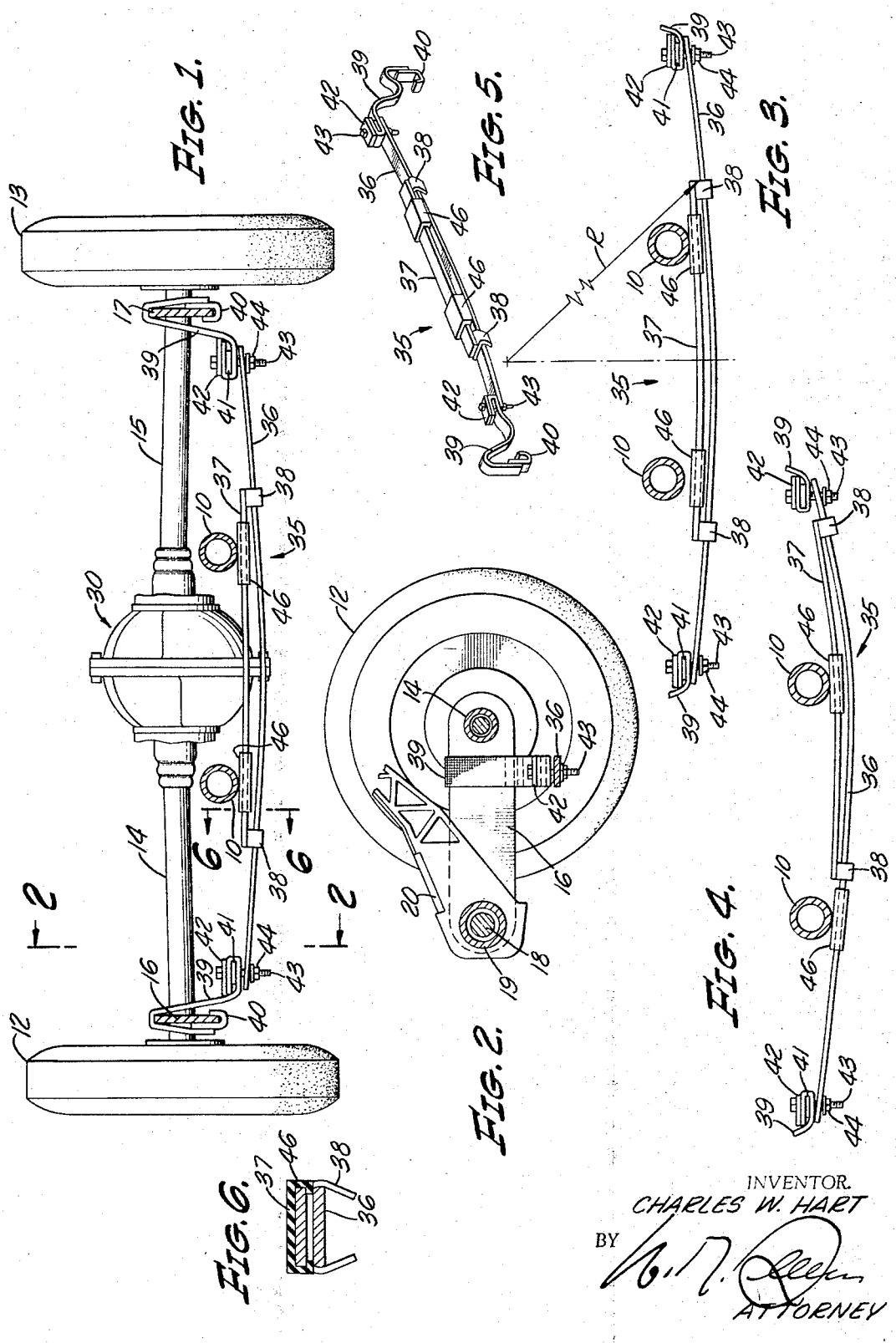
Dec. 20, 1966     C. W. HART     3,292,918
VARIABLE-RATE STABILIZING ASSEMBLY FOR MOTOR VEHICLES
Filed March 22, 1965
INVENTOR.
CHARLES W. HART
BY
ATTORNEY

United States Patent Office 3,292,918
Patented Dec. 20, 1966

This invention relates to motor vehicles and more particularly to an improved and superior roll stabilizing assembly adapted to be supported transversely of the vehicle adjacent either end thereof and providing highly superior stabilizing characteristics including in particular counteracting sidewise roll of the sprung weight and otherwise improving the roadability and related operating characteristics of the vehicle.

The present invention is related to my copending application for United States Letters Patent Serial No. 170,373, filed February 1, 1962, but incorporates various improvements and capabilities not present in the prior construction. The present invention utilizes the components of the original stabilizer assembly in combination with other components providing new and substantial benefits.

One of the dominant and essential functions of a stabilizer is to resist roll of the vehicle arising from a variety of operating conditions and notably cross winds, centrifugal forces prevailing while the vehicle is rounding curves and combinations of these two principal causes. There are a multitude of other causes of roll but those just mentioned are of primary concern. It is most desirable that the forces which cause roll be automatically counteracted before actual roll is initiated without interfering objectionably with other operating characteristics of the chassis and particularly of the wheel suspension system. These objectives were achieved in a major degree by the stabilizer assembly disclosed and claimed in the aforementioned pending patent application.

The present invention provides materially improved characteristics by reason of a composite or compound stabilizer assembly comprising a relatively long, highly flexible spring unit in combination with a shorter relatively stiff spring member. This stiff spring is sandwiched between the vehicle frame and the long leaf spring member and enables the latter to operate substantially independently of the stiff spring or in combination therewith depending upon the particular operating conditions. In other words, the invention stabilizer interferes negligbly with the soft riding characteristics of the normal vehicle wheel suspension means in the absence of conditions tending to create roll while offering relatively strong and powerful roll counteracting forces tending to maintain the sprung weight in its normal upright position. Thus, the present stabilizer assembly is selectively responsive to vertical acting forces as contrasted with forces representative of vehicle roll, the stabilizer assembly offering a minimum of resistance to changes in vertically acting forces and offering relatively strong resistance to roll forces.

My improved stabilizer is equally suitable for application across either the rear and front ends of vehicles having a wide range of conventional wheel suspension systems including both solid axle and swing axle carriage systems. In any case, the stabilizer assembly is mounted crosswise of the vehicle adjacent a pair of carriage wheels with its opposite ends suitably connected to the wheel end of the wheel suspension assembly and with the ends of its shorter spring member bearing against the adjacent sides of the sprung chassis frame. According to one mode of use, this shorter component of the stabilizer is positioned centrally of the stabilizer, but in other applications the rigid member may be shifted endwise in either direction to compensate for nonuniform conditions in the vehicle, the loading thereon, or in circumstances where it is known that roll forces will be occurring most frequently in one direction as, for example, when applied to a racing car operating on a circular track.

It will therefore be understood that the invention stabilizer includes means for readily adjusting its operating characteristics and that it is unusually simple and readily incorporated in existing vehicles as an accessory or engineered as a standard component of newly manufactured vehicles. It is also readily applicable to either end of the vehicle and irrespective of the type of axle or wheel suspension system employed.

Accordingly, it is a primary object of the present invention to provide an improved and unique stabilizer assembly for motor vehicles equally suitable for incorporation as an accessory or as part of the original equipment.

Another object of the invention is the provision of an improved variable-rate stabilizer assembly providing highly effective resistance countering tendency of the vehicle frame and body to roll without interfering in any substantial way with the normal riding characteristics of the wheel suspension system.

Another object of the invention is the provision of a composite, variable-rate stabilizer assembly for application to both straight and swing axle type carriage assemblies strongly resisting sidewise roll without substantial increase in forces acting vertically within the individual wheel suspension means.

Another object of the invention is the provision of a simple, inexpensive, rugged composite stabilizer assembly installable crosswise of a vehicle end and including a long, relatively soft leaf spring having its opposite ends connected to the wheel ends of the individual wheel spring suspension units and including a shorter, relatively stiff spring member interposed between the underside of the vehicle frame and the portions of the leaf spring to either side of the frame and including provision for relative lengthwise shifting of these two elements to provide modified operating results.

Another object of the invention is the provision of a stabilizing assembly for a motor vehicle having simple provision for adjusting the assembly to provide differential stabilizing action against roll in one direction in comparison with roll in the other direction and, in addition, to compensate for particular vehicle operating conditions such as nonuniform loading or weak springs on one side thereof.

These and other more specific objects will appear upon reading the following specification and claims and upon considering in connection therewith the attached drawings to which they relate.

Referring now to the drawings in which a preferred embodiment of the invention is illustrated.

FIGURE 1 is a fragmentary cross-sectional view across one end of a vehicle showing a preferred embodiment of the invention stabilizer mounted thereon;

FIGURE 2 is a fragmentary cross-sectional view taken along line 2—2 on FIGURE 1;

FIGURE 3 is a fragmentary view similar to FIGURE 1 but showing the relationship of the stabilizer parts to one another under extreme right roll conditions;

FIGURE 4 is a fragmentary view of the stabilizer showing an extreme adjustment to counteract nonuniform loading or roll of a racer while operating on a circular track;

FIGURE 5 is a perspective view of the stabilizer assembly per se; and

FIGURE 6 is a cross-sectional view on an enlarged scale taken along line 6—6 on FIGURE 1.

Referring initially more particularly to FIGURE 1, there is shown one of many typical vehicles for use with which the stabilizer is admirably suited and sold commercially under the trade name "Volkswagen." This figure illustrate the rear end construction of this vehicle and is well known in this art. It will also be understood that reference may be had to the above-mentioned copending application for details of the vehicle chassis. The vehicle chassis will be understood as having an elongated rigid main frame extending lengthwise of the vehicle and having a forked rear end, each leg 10 of which is tubular. It will be understood that legs 10 are integral with one another and with the main body of the frame immediately forward of transmission assembly 30. This transmission is provided with means, not shown, rigidly connecting the same to the vehicle frame adjacent its point of connection to legs 10, 10. The engine proper is not shown but, as is well known, is mounted directly rearwardly of transmission 30 and of rear wheel axle housing 14, 15. These housings are pivotally connected adjacent their inner ends to the opposite sides of transmission 30 and support rear wheels 12, 13 at their outer ends.

In a wheel suspension system of the swing axle type here illustrated by way of example, the outer end of each axle housing, as 14, is rigidly secured to a bracket arm projecting generally forwardly of the axle and having its forward end welded or otherwise rigidly secured to a torsion spring rod 18. This torsion spring extends generally horizontally transversely of the vehicle frame and has its inner end rigidly secured to the center portion of this frame. Surrounding torsion spring 18 is a tubular housing 19 anchored at its inner end to the frame with its outer end terminating adjacent the inner face of bracket 16. A strong bracket member 20 projects upwardly and rearwardly from the outer end of tube 19 and has its lower end welded or otherwise rigidly secured to this tube. It will be understood that its upper end, not shown, terminates generally above housing 14 and provides the pivotal anchorage for the upper ends of a shock absorber, not shown. This shock absorber is of any suitable type and extends downwardly and rearwardly to a pivot connection with a bracket underlying and secured to the rear end of wheel bracket 16. It will be understood that the described torsion spring suspension system for rear wheel 12 is present in identical form on the other side of the vehicle to connect wheel 13 to the main frame.

From the foregoing, it will be recognized that each wheel is movable through a limited vertical path relative to the other and relative to the frame under the control of its own torsion spring and shock absorber. Although each wheel is shown mounted on an independent and vertically pivotable axle housing, it is pointed out and emphasized that the present invention is equally applicable to vehicles having a rigid axle housing movable as a unit in a vertical plane.

The stabilizer assembly, designated generally 35, comprises a long leaf spring 36 and a relatively short, relatively stiff spring 37 superimposed thereon and slidably held in assembled position thereabove, as by clips 38 welded or otherwise secured to the ends of member 37. This assembly has an overall length somewhat less than the distance between wheel brackets 16 and 17 forming the connection between the individual wheels and the adjacent end of the spring means for each wheel. Simple connector means for attaching the opposite ends of the stabilizer assembly 35 to brackets 16 and 17 are here shown as comprising flexible nylon straps provided with a hook 40 at their outer ends engageable over the edge of wheel brackets 16 and 17. The opposite ends of the straps are here shown as looped around a washer 41 and beneath an adjustable upper washer 42. A threaded bolt 43 passes through both washers, aligned openings in strap 39 and through an opening at the outer ends of leaf spring 36. Nut 44 preferably has a snug friction fit with the threaded bolt so as to remain securely in any adjusted position or, if desired, a locknut may also be used for this purpose. This nut or nuts are adjustable along the bolt to vary the tension on straps 39.

Washer 42 will be understood as rectangular in shape and has its opening offset from the center of the washer toward one edge. Owing to this eccentric location of the bolt opening, it will be recognized that the washer can be rotated to a position on the bolt shank so that either its near or its far edge engages the vertical face of strap 39 thereby to vary the effective length of the stabilizer assembly. As washers 42 are assembled in FIGURE 1, it will be observed that the base ends of straps 39 are spaced a maximum distance apart. If each of the washers is rotated 180 degrees about the axes of bolts 43, then the spacing between the base ends of the straps will be somewhat less thereby modifying to some degree the performance characteristics of the stabilizer assembly.

The stabilizer assembly also preferably includes a pair of resilient nonmetallic pads of C-shape in cross-section telescoped over the ends of rigid member 37 and forming bearing pads between the underside of frame members 10, 10 and components of the stabilizer. As shown in FIGURES 1 and 3, these pads are positioned between the frame and the opposite ends of spring 37, whereas in FIGURE 4, spring 37 is adjusted to a position offset longitudinally from the center of leaf spring 36. In these circumstances, pads 46 are assembled one to member 36 and one to spring 37.

It is pointed out that the important stabilizer spring 37 preferably has a length substantially shorter than member 36 but appreciably longer than the spacing between chassis frame members 10, 10 or their equivalents in other types of chassis frames. According to a typical and usual mode of assembly, spring 37 is located centrally of leaf spring 36 with its opposite ends projecting by equal distances beyond the outer faces of the frame members. Also, in a typical installation, connector straps 39 and bolts 43 are so adjusted as to hold the stabilizer unit and pads 46 thereof pressed firmly and resiliently against the underside of frame members 10, 10. A typical appearance of the stabilizer when so adjusted is illustrated in FIGURE 1, it being noted that the relatively short leaf spring 36 desirably is preloaded sufficiently to be bowed downwardly with the opposite transverse ends of member 37 and clips 38 carried thereby bearing or fulcrumed against the juxtaposed upper surface of member 36, the actual fulcrum line being the remotely located lower edge corners of clips 38. Owing to the preload stresses then acting on the stabilizer components it will be understood that there is substantial friction losses at these fulcrums during increased loading imposed should the vehicle body and frame tend to roll.

Let it be assumed that the vehicle is passing along the highway and over bumps and depressions in the road. In these circumstances, wheels 12 and 13 will move up and down vertically with respect to the rigid unitary chassis frame of the vehicle in the manner well known to those familiar with vehicle chassis systems. In so doing, the spring suspension for the several wheels absorbs a major portion of the wheel movement, but limited vertical movement is also imparted to the vehicle frame causing both sides of the frame to move upwardly and downwardly in the same general horizontal plane. Thus under these conditions spring 36 flexes freely and without altering in any material way the design characteristics of the individual wheel suspension systems.

Now let it be assumed that the vehicle makes a sharp turn to the left. Centrifugal forces acting generally horizontally through the center of gravity of the sprung vehicle weight tend to cause the vehicle to roll to the right. Under these conditions the right hand side of the frame tends to settle and the left hand side tends to rise. However actual lowering of the right and raising of the left sides of the frame normally occurs only to a slight degree because of the highly effective stabilizing action provided by assembly 35. In this connection it is pointed out that, during installation, both springs 36 and 37 are preloaded upwardly against the underside of the frame by the proper adjustment of suspension connections 39, 39 relative to the associated wheels on either side of the vehicle. Due to this relatively firm resilient supporting action so provided by the stabilizer the tendency of the body and frame to roll must first overcome the sprung weight of the vehicle body. In other words, the roll force acts generally horizontally through the center of gravity of the sprung vehicle weight. As is well known this center of gravity can be considered as lying within a vertical plane passing through the longitudinal center line of the vehicle. Owing to the supporting action of the stabilizer at its points of contact with the underside of frame sides 10, 10, it will be appreciated that the roll radius is the distance between this center of gravity and a line passing lengthwise of the vehicle and offset to the left at about the point of contact of the right hand side of frame 10 with the stabilizer, the general location of this radius being indicated by the incomplete line marked R on FIGURE 3. For this reason it will be apparent that the weight of the vehicle is highly effective in cooperation with the supporting action provided by the stabilizer to prevent roll until the roll forces are sufficient to lift a portion of the weight of the vehicle body. Actually it will be appreciated that the stabilizer assembly is not sufficiently strong to carry the sprung weight of the body without deflection. For this reason there is slight downward deflection of the right end of the stabilizer, that is, the end thereof closest to the direction of roll. This deflection, along with the slight actual roll of the body, supplement one another in relieving the normally prevailing force being applied upwardly against the left hand side of the frame by the stabilizer. The reduction in this upward force on the left side of the frame is therefore seen as acting to decrease rightward roll forces.

Under rather extreme roll conditions there is a complete unloading of the stabilizer from one end of the stabilizer. This condition is illustrated in FIGURE 3. It will be noted that the roll force is now so great that the left hand side of frame 10 is actually out of contact with pad 46. In consequence, the highly stressed condition of the stabilizer is now imparted upwardly in full force against the right hand side of frame 10 to provide maximum corrective action tending to right the vehicle and restore it to its normal vertical position. As the vehicle body moves back toward the vertical position, the left hand side of the frame comes into contact with the underlying portion of the left end of the stabilizer thereby stressing this end of the stabilizer and providing an upward force highly effective in cushioning the return of the body to the left and arresting the return roll movement. Because of this action the body will not roll past its dead center position in any material amount except under extreme conditions.

Referring to FIGURE 4, one extreme adjustment of springs 36 and 37 is shown to illustrate another aspect of the invention. This position of the stabilizer components is one which might be used by a racing driver to counteract tilt caused by the driver if seated along one side of the car, as is usual. In these circumstances the loading on the chassis is unbalanced due to the offset position of the driver. In addition, if the car is being driven counterclockwise around a circular track, the centrifugal forces will add to the unbalanced loading and require stronger than normal counterbalancing and stabilizing action. Such stabilizing action is readily available using the stabilizer assembly of the present invention applied as shown in FIGURE 4.

It will be observed that spring 36 is rather deeply bowed toward its right hand end and that stiff spring 37 is likewise slightly bowed downwardly. The left hand end portion of spring 36 is in contact with the left hand side of the frame so as to apply upwardly acting forces tending to counteract roll to the left. Likewise the right hand ends of spring 36 and spring 37 are both preloaded and supplemment one another in providing an appreciably stronger upward bias against the right hand side of frame 10 in order to compensate for the greater weight of the driver or a weak spring on this side of the vehicle, as well as to provide stronger stabilizing action against roll to the right. The vehicle is now in condition to resist strongly any tendency of the vehicle body to roll to the right. Any increase in the downward forces on the right hand side of the frame is transmitted in major part to the right hand end of spring 36 and in minor part to the left hand end by way of the relatively stiff spring 37. Under these conditions of loading the right hand end of the stabilizer is highly resistant to downward deflection and also applies a very powerful downward roll resistant force to the left hand wheel assembly.

Under the conditions of use just described, the stabilizer is highly effective in countering roll to the right and effective to a considerably lesser degree in its ability to resist left hand roll. However this latter weakness is not of importance since the vehicle is being driven counterclockwise around a circular track and there is substantially no left hand roll tendency unless strong cross winds are present. Under conditions when spring 37 is centrally located on spring 36 as shown in FIGURE 1 the ability of the stabilizer to resist either right or left roll is equally effective.

It is also pointed out and to be understood that the described variable rate stabilizer assembly may be employed advantageously with vehicles equipped with conventional stabilizer systems. When so used, the corrective stabilizing action can be and generally is substantially in excess of the sum of the individual stabilizing actions of the systems taken separately. For example, a conventional type of stabilizer employs a U-shaped torsion member having the bight portion of the U extending crosswise of the frame and journaled to the adjacent opposite sides of the frame, and with the ends of the stabilizer legs connected to the wheel end of the individual wheel suspension systems. Such a stabilizer is normally unstressed and is therefore effective to provide stabilizing action only after being placed in a torsional stress by a substantial roll of the body. If the present stabilizer assembly is installed in parallel with such a normally unstressed torsional system, it will be evident that the invention stabilizer is capable of countering roll immediately and before any actual roll occurs. However, if the roll conditions are more extreme, then the torsional stabilizer is brought into play to augment the roll resisting capabilities of spring stabilizer assembly 35. In addition, the inherent tendency of the torsional stabilizer to lift the wheel on the opposite side of the vehicle toward which roll is occurring is offset in major part, if not entirely, by the increased loading placed on this wheel by spring stabilizer system 35.

While the particular variable-rate stabilizing assembly for motor vehicles herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In a vehicle of the type having a main frame supported at its ends by spring-suspended wheels including means movably connecting each to said frame, that improvement which comprises stabilizing means for counteracting vehicle roll forces without materially altering the soft springing characteristics of the wheel springs, said stabilizing means comprising long leaf spring means extending crosswise of said main frame adjacent said wheels having means connecting the ends thereof to said means movably connecting said wheels to said main frame, and relatively stiff spring load distributing means located between said frame and the upper side of said leaf spring and having load bearing contact with the opposite end portions of said leaf spring at points spaced outwardly from the exterior side faces of said frame, whereby any tendency of said frame to roll sidewise is powerfully resisted by said stabilizer assembly.

2. A vehicle as defined in claim 1 wherein said relatively stiff spring load distributing means comprises an elongated member closely overlying the upper side of said leaf spring with its opposite end portions bearing against the underlying top surface of said leaf spring, and means for holding said load distributing stiff spring means and said leaf spring so assembled relative to one another.

3. A vehicle as defined in claim 2 characterized in that said load distributing stiff spring means is shiftable lengthwise of said leaf spring and closer to one end of said leaf spring than to the other end thereof whereby said stabilizing means is more effective in countering vehicle roll in one direction than in the opposite direction.

4. A vehicle stabilizer assembly for counteracting sidewise roll forces while the vehicle is underway, said stabilizer assembly comprising an elongated leaf spring adapted to extend crosswise beneath a vehicle frame adjacent the wheels at one end thereof and having a length less than the distance between said wheels, connector means for connecting the ends of said leaf spring to a nonrotating part of the adjacent wheel, and relatively stiff spring means mounted against the upper midportion of said leaf spring with its ends bearing against the underlying portion of said leaf spring and adapted to have the upper side thereof normally held pressed against at least one side of a vehicle chassis frame, said stiff spring means having a length substantially shorter than the length of said leaf spring but longer than the width of the vehicle frame with which said stabilizer assembly is to be used.

5. A vehicle stabilizer assembly as defined in claim 4 characterized in that said relatively stiff spring means includes means for normally holding the same assembled in superimposed relation to said leaf spring and free for adjustment lengthwise thereof.

6. A vehicle stabilizer assembly as defined in claim 4 characterized in that the opposite end portions of said relatively stiff spring means include means for embracing the lateral edges of said leaf spring to hold said two springs in face-to-face assembled relation and free for relative lengthwise adjustment and cooperating under load to provide a variable rate spring stabilizer assembly.

7. A stabilizer assembly as defined in claim 4 characterized in that said connector means includes flexible strap means, and adjustable means for connecting said strap means to the ends of said leaf spring in differently adjusted positions.

8. A stabilizer assembly as defined in claim 7 characterized in that said adjustable means includes bolt and nut means connecting said strap means to the end of said leaf spring, and washer means mounted on said bolt and having an opening therein to receive the bolt shaft shank and located eccentrically of said washer means, whereby said washer is rotatable to different positions to vary the distance of its edge from the transverse end portion of the leaf spring, and said flexible strap means being adapted to be tensioned across the rim edge of said washer.

9. In a vehicle of the type having a long main frame, a pair of wheel means supporting one end of said frame including spring means between each wheel and said frame, stabilizer means for strongly resisting sidewise roll of said frame in either direction about an axis extending lengthwise of the vehicle without substantially interfering with the soft riding characteristics of the spring suspension means for said wheel means, said stabilizer means comprising long leaf spring means extending transversely of and closely beneath said frame adjacent said wheel means, flexible means connecting the respective ends of said leaf spring means to the wheel end of the spring means interconnecting said wheels and frame, and relatively stiff spring means overlying the major length of said leaf spring with the opposite ends thereof bearing against said leaf spring between the end of the leaf spring and the adjacent side of the frame, said flexible connecting means being adjusted to load the upper side of said stiff spring means against said frame, and any roll forces acting on the sprung weight of the vehicle being effective to increase the loading on one end of said stabilizer assembly and to decrease the loading on the other end thereof and responsive to this change in loading to apply a relatively powerful counterforce back to said frame in a direction counteracting the tendency thereof to roll.

10. In a vehicle of the type having a long main frame, a pair of wheel means supporting one end of said frame including spring means between each wheel and said frame, stabilizer means for strongly resisting sidewise roll of said frame in either direction about an axis extending lengthwise of the vehicle without substantially interfering with the soft riding characteristics of the spring suspension means for said wheel means, said stabilizer means comprising long leaf spring means extending transversely of and closely beneath said frame adjacent said wheel means, flexible means connecting the respective ends of said leaf spring means to the wheel end of the spring means interconnecting said wheels and frame, and relatively stiff spring means overlying the major length of said leaf spring with the opposite ends thereof bearing against said leaf spring between the end of the leaf spring and the adjacent side of the frame, said flexible connecting means being adjusted to load the upper side of said stiff spring means against said frame, and any roll forces acting on the sprung weight of the vehicle being effective to increase the loading on said stabilizer assembly, said stabilizer assembly being effective to transfer a portion of said roll forces to the wheel on the side of the vehicle remote from the direction of roll thereby to hold said wheel against the road, and said stabilizer assembly being effective to utilize another portion of said roll forces to counteract roll of the vehicle.

No references cited.

ARTHUR L. LA POINT, *Primary Examiner.*

R. M. WOHLFARTH, *Assistant Examiner.*